United States Patent [19]
Kim

[11] Patent Number: 5,128,990
[45] Date of Patent: Jul. 7, 1992

[54] METHOD FOR EXCHANGING A BUZZ SIGNAL BETWEEN KEYPHONE SUBSETS

[75] Inventor: Moon-Shik Kim, Ahnyang, Rep. of Korea

[73] Assignee: SamSung Electronics Co., Ltd., Kyung-Ki Do, Rep. of Korea

[21] Appl. No.: 598,976

[22] Filed: Oct. 17, 1990

[30] Foreign Application Priority Data

Oct. 18, 1989 [KR] Rep. of Korea .......... 1989-15001[U]

[51] Int. Cl.$^5$ ........................ H04M 1/21; H04M 1/72
[52] U.S. Cl. ..................................... 379/164; 379/373
[58] Field of Search ............... 379/156, 157, 164, 70, 379/167, 79, 373

[56] References Cited

U.S. PATENT DOCUMENTS 3,928,732 12/1975 Simon et al. ........................ 379/164
4,228,324 10/1980 Rasmussan et al. ................ 379/164

Primary Examiner—Stafford D. Schreyer
Attorney, Agent, or Firm—Robert E. Bushnell

[57] ABSTRACT

A method for exchanging a buzz signal between two different subsets attendant to a keyphone system with a buzzer pair table is disclosed. The buzzer pair table has information associated with pairs of any one subset and its corresponding other subset to be called by said buzz signal, and the subsets each have a buzzer key producing the buzz signal. The method includes the steps of:
(a) actuating the buzzer key of a first subset;
(b) causing a central processing unit of the keyphone system to access the buzzer pair table thereof so as to compute a port address of a second subset to be called up by the first subset;
(c) causing the central processing unit to transmit tone-ringer-on data to the second subset according to the result of computing the port address;
(d) causing a control unit of the second subset, upon reception of the tone-ringer-on data, to control a tone control switch of the second subset so that a tone-ringer of the second subset provides a speaker with a tone signal for a given time period; and
(e) checking existence of further input of the buzz signal and in response thereto, ending the control sequence, otherwise returning the control sequence to step (b).

3 Claims, 3 Drawing Sheets

METHOD FOR EXCHANGING A BUZZ SIGNAL BETWEEN KEYPHONE SUBSETS

BACKGROUND OF THE INVENTION

The present invention relates to a method for exchanging a buzz signal between subsets of a keyphone system or in a private telephone exchange system.

One of the known methods used to transfer a received telephone signal between two different subsets of a keyphone system is to employ an additional and separate interphone set in a bridge connection or to use a special transfer switch with such a function. For example, when a secretary answers a call for another person, (i.e., her or his superior) and then needs to connect the call to a subset of that person, she or he usually uses an additional interphone, another telephone line, or another predetermined transfer means, in order to send a buzz signal to the subset of the person.

One of the drawbacks in such a transferring method is the cost of an additional interphone set. Moreover, even if there is used another internal telephone line of a keyphone system to inform the other person of the call or send a buzz signal for a transfer call, when he is engaged in his own other calling, he may not be able to receive the call or signal without properly paying attention to his own subset. This can cause a considerable inconvenience to a secretary or an operator of a keyphone system.

SUMMARY OF THE INVENTION

It is therefore an object of the present invention to provide a method for exchanging a buzz signal between a pair of predetermined subsets in a key telephone system having a plurality of subsets, whereby an operator or one receiver is capable of sending the buzz signal to a subset of another receiver or subscriber to inform him of an incoming telephone call or a call transfer.

To achieve the above object and other advantages of the present invention, a preferred embodiment of a method for exchanging a buzz signal between two different subsets attendant to a keyphone system with a buzzer pair table, wherein the buzzer pair table has information associated with pairs of any one subset and its corresponding other subset to be called by the buzz signal, and the subsets each have a buzzer key producing the buzz signal, includes the steps of:
(a) actuating the buzzer key of a first subset;
(b) causing a central processing unit of the keyphone system to access the buzzer pair table thereof so as to compute a port address of a second subset to be called up by the first subset;
(c) causing the central processing unit to transmit tone-ringer-on data to the second subset according to the result of computing the port address;
(d) causing a control unit of the second subset, upon reception of the tone-ringer-on data, to control a tone control switch of the second subset so that a tone-ringer of the second subset provides a speaker with a tone signal for a given time period; and
(e) checking existence of further input of the buzz signal and in response thereto, ending the control sequence, otherwise returning the control sequence to step (b).

BRIEF DESCRIPTION OF THE DRAWINGS

For a better understanding of the present invention and to show how the same may be carried into effect, reference will now be made, by way of example, to the accompanying diagrammatic drawings, in which.

DETAILED DESCRIPTION OF THE INVENTION

Figure 1:
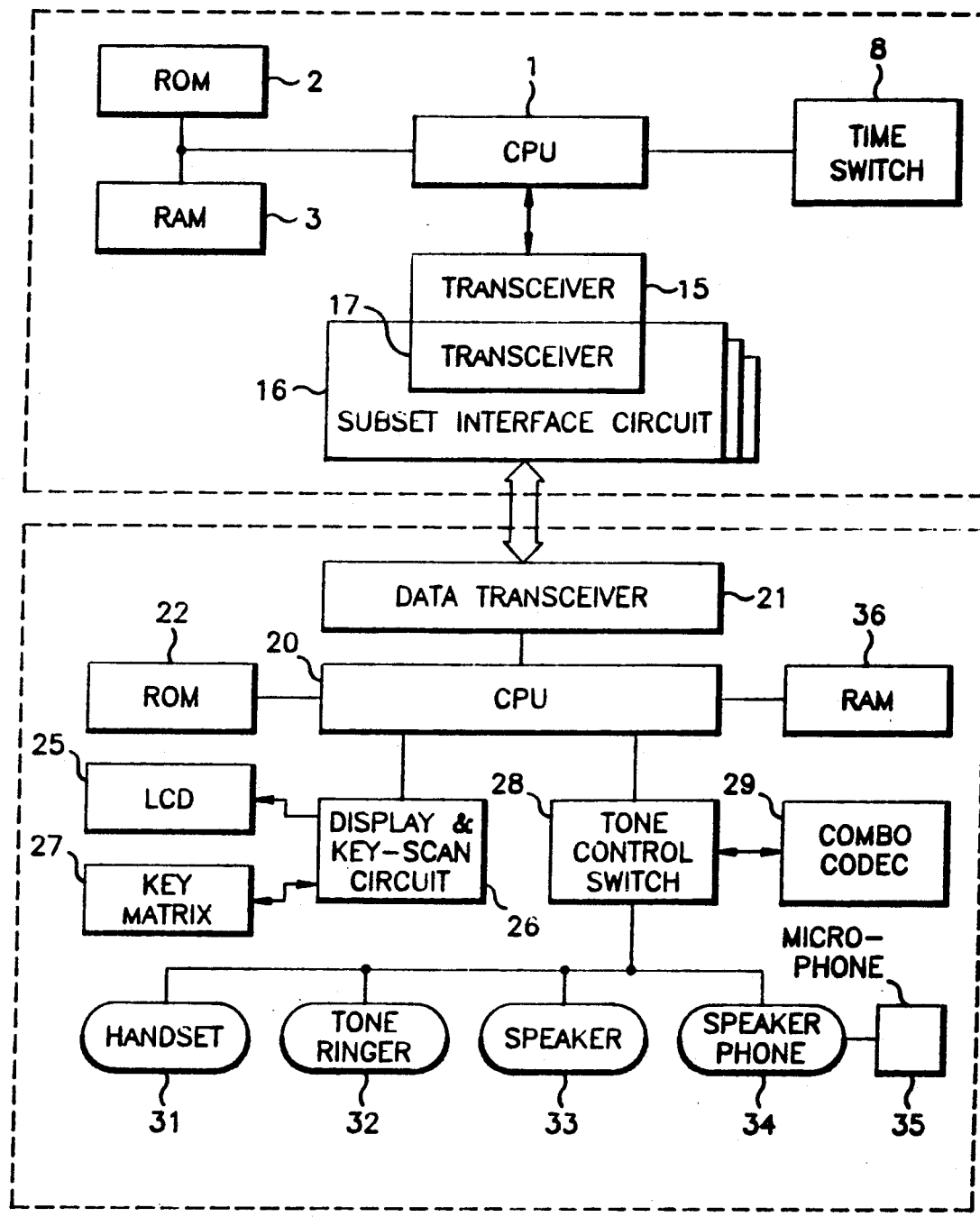
FIG. 1 is a block diagram indicative of a circuit construction of a main set and a subset in a keyphone system according to the present invention.

Referring to FIG. 1, a block diagram indicative of a circuit construction of a main system set 100 and a subset 200 in a keyphone system having a plurality of subsets according to the present invention is shown. In the main set, central processing unit (CPU) 1 accesses Random Access Memory (RAM) 3 and Read Only Memory (RAM) 2, controls time switch 8, and communicates with the subset 200 via transceivers 15 and 17 of a subset interface circuit 16.

The subset 200 also includes a central processing unit (CPU) 20 to access a ROM 22 and a RAM 36, in which the CPU 20 transfers control data and display data received through data transceiver 21 from the main system 100 to corresponding following circuits, and also transfers data from key matrix 27 of the subset to the main system through data transceiver 21. The CPU 20 of the subset 200 also controls tone control switch 28 to allot channels of combocodec 29, and serves to connect speaker 33, microphone 35 and tone-ringer 32 to each other according to data from the main system 100.

Now, a brief description of the operation of this system is made with reference to the block diagram of FIG. 1. When a key of speaker 33 in the subset 200 is pressed, the CPU 20 transfers, as key data, the data from display and key scanning circuit 26 to the main system 100 through data transceiver 21. The key data from the subset 200 is transferred through transceivers 15 and 17 of the subset interface circuit 16 to the main system 100. Once the main system 100 analyzes the key data as indicating a key input from speaker 33, it generates a signal sound by connecting time switch 8, and transfers LCD/LED display data through subset interface circuit 16 to the subset 200. The CPU 20 analyzes the display data received through data transceiver 21, by which data the corresponding ones of LCD display 25 and/or LED display in key matrix 27 are respectively turned on. Here, if a handset of the subset phone is hooked on, the CPU 20 turns on speaker 33 and microphone 35. Thus, a user of the subset 200 could hear the signal sound from speaker 33.

If a certain caller makes a telephone call to the subscriber of a subset 200, the CPU 1 of the main system 100 transmits tone ring data and LCD/LED control data associated with the caller's telephone subscriber number through interface circuit 16 of the subscriber's subset to the subset 200. Then, the CPU 20 of the subset 200 analyzes the data from data transceiver 21, so that the LCD/LED control data controls the circuits associated with the LED/LCD display and the tone ring data controls tone-ringer 32 in tone control switch 28 to produce a ring sound. Hence, the subscriber perceives at the subset 200 that somebody is calling him.

Here, if the subscriber presses the speaker key in response to the ringing of the tone-ringer, the CPU 1 of the main system 100 supplies the subset 200 with tone-ringing-off data so as to cause tone control switch 28 to turn off the tone-ringer. Then, with speaker 33 and microphone 35 turned on, the subscriber and the caller can communicate with each other by using speaker 33 and microphone 35.

Alternatively, instead of using speaker key 33, if picking up handset 31, the key scanning circuit of the subset 200 detects it to transfer the data thereof to the main system 100, so that the CPU 20 of the subset 200 causes tone control switch 28 to connect the tone signal to handset 31 and turn off speaker 33 and microphone 35, thereby establishing the communication channel through handset 31.

Figure 2:
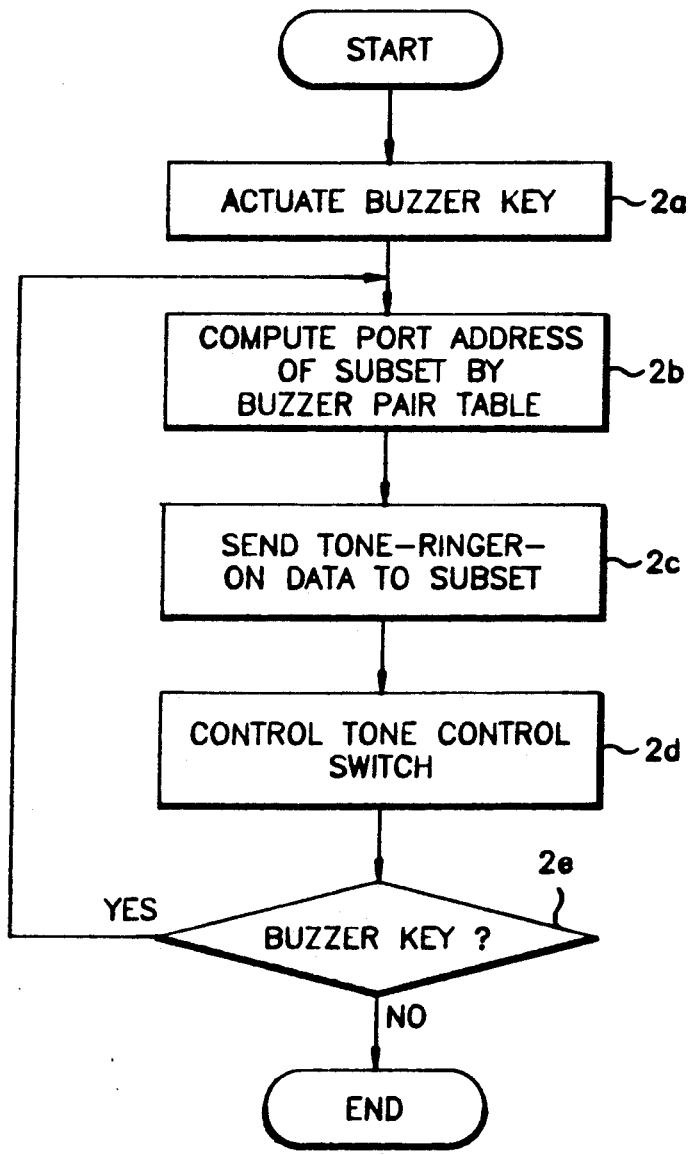
FIG. 2 is a flow chart of a preferred embodiment of a method of exchanging a buzz signal according to the present invention.
Figure 3:
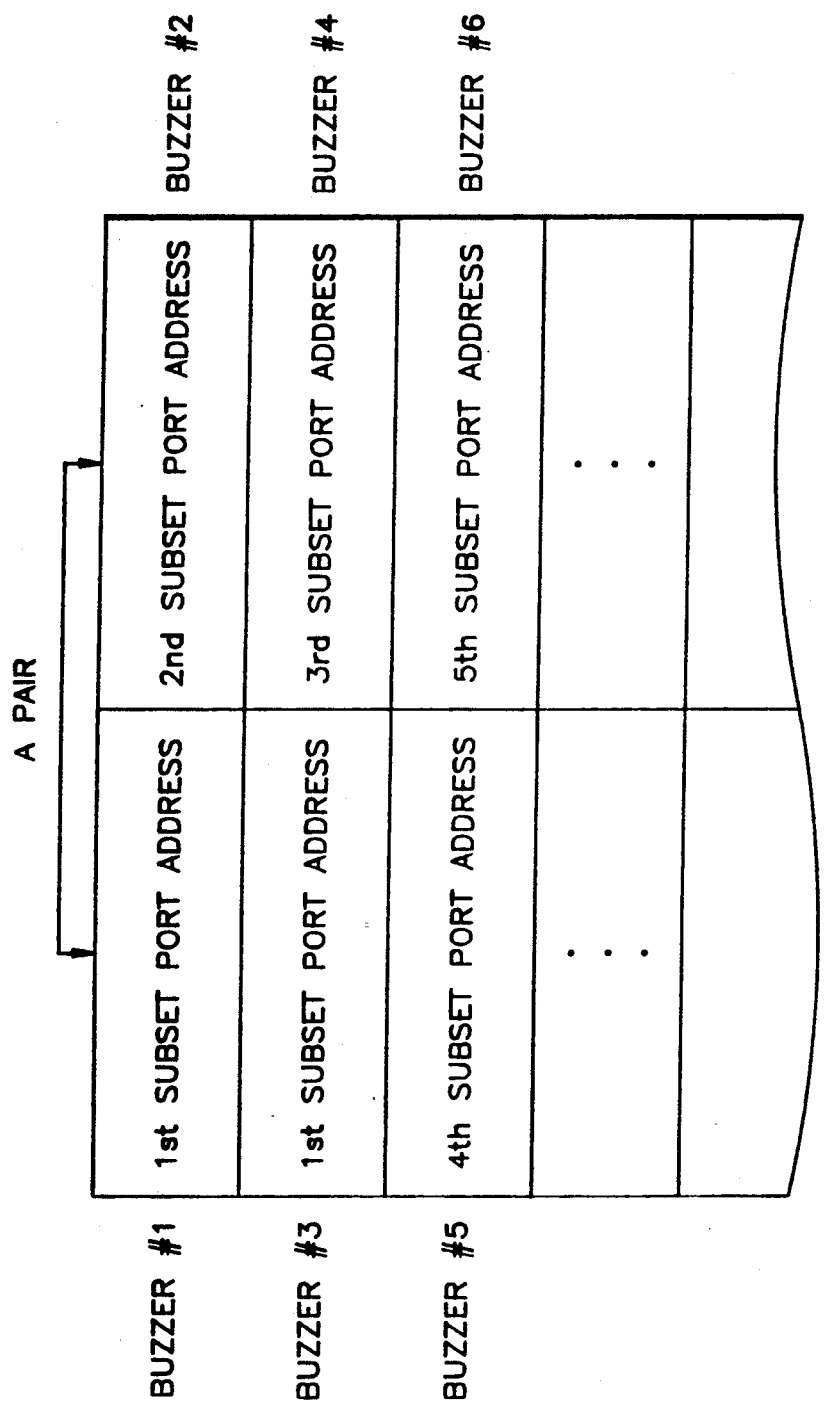
FIG. 3 is an example of a buzzer pair table prepared in a memory area of the embodiment according to the present invention.

Referring to FIG. 2, a flow chart of a preferred embodiment of a method of exchanging a buzz signal according to the present invention is disclosed. First, in step 2a, once a buzz key of a subset attendant to a key phone system is actuated, a key scanning logic circuit of the subset 200 detects the actuation and transfers the keyed data to the main system 100. Then, in step 2b, the CPU 1 of the main system 100 computes an address of the caller's port from a function key table and a buzzer pair table stored in advance in the ROM 2 as shown in FIG. 3. Thirdly, in step 2c, in accordance with the result of the address computation, the CPU 1 of the main system 100 transmits the tone-ringer-on data through a channel allotted by subset interface circuit 16 to the caller's subset. Next, in step 2d, after receiving the tone-ringer-on data, the CPU 20 of the subset 200 controls tone control switch 28 to cause tone-ringer 32 to generate a signal tone through speaker 33 of the subset for a given time. Finally, in step 2e, existence of an input of the next buzzer key is checked, and in response to the checked result, the control sequence of the key phone system ends its operation or returns to the second step 2b, depending upon existence of further input of the buzz key.

Therefore, the control sequences for exchanging a buzz signal between one subset and another selected subset, for example, an operator or secretary and his or her superior, according to the above described embodiment of the present invention may be summarized as follows:

1) the operator's subset is called by a caller subset who desires to speak to one of her superiors;
2) whether the selected superior's subset phone is busy or not at the very moment, the operator depresses a buzz key number designated for the person in a specified manner; and
3) a buzz signal rings on the person's subset phone and he answers to the incoming call or transfers his own line to the caller in response to the buzz signal.

Thus, according to the present invention, subsets attendant to a key phone system may exchange a buzz signal to each other without an additional interphone or direct telephoning whether or not their own telephone lines are busy. This could allow a user of a key telephone system to save the telephone expense as well as to increase the communication efficiency.

The foregoing description shows only a preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A method for exchanging a buzz signal between two different subsets attendant to a keyphone system with a predetermined buzzer pair table, said predetermined buzzer pair table including information associated with pairs of any one subset and its corresponding other subset to be called by a buzz signal, said subsets each having a buzzer key producing said buzz signal, said method comprising the steps of:
   (a) actuating said buzzer key of a first subset;
   (b) causing a central processing unit of said keyphone system to access said buzzer pair table for computing a port address of a second subset to be called up by said first subset;
   (c) causing said central processing unit to transmit tone-ringer-on data to the second subset according to the result of computing said port address;
   (d) causing a control unit of said second subset, upon reception of said tone-ringer-on data, to control a tone control switch of said second subset so that a tone-ringer of said second subset provides a speaker with a buzz signal for a given time period; and
   (c) making a determination of the existence of further input of said buzz signal, and in response to the determination, ending the control sequence of said keyphone system.

2. A method for exchanging a buzz signal between two different subsets attendant of a keyphone system with a predetermined buzzer pair table, wherein said predetermined buzzer pair table comprises information associated with pairs of any one subset and its corresponding second subset to be called by a buzz signal, said subsets each having a buzzer key producing said buzz signal, said method comprising the steps of:
   (a) actuating said buzzer key of a first subset;
   (b) causing a central processing unit of said keyphone system to access said buzzer pair table for computing a port address of a second subset to be called by said first subset;
   (c) causing said central processing unit to transmit tone-ringer-on data to the second subset according to the port address of said second subset computed; and
   (d) causing a control unit of said second subset, upon reception of said tone-ringer-on data, to control a tone control switch of said second subset and enable a tone-ringer of said second subset to provide a speaker with a buzz signal for a given time period.

3. In a keyphone system having a central system and a plurality of subset attendants, said central system comprises a central processing unit for accessing a predetermined buzzer pair table stored in a read-only-memory (ROM) under a direction of any one subset attendant from said plurality of subset attendants for determining a port address of a corresponding subset attendant once an incoming call is made, a method for exchanging a buzz signal between two different subset attendants using said predetermined buzzer pair table, wherein said predetermined buzzer pair table comprising information associated with pairs of any one subset attendant and its corresponding other subset attendant to be called by a buzz signal, each subset attendant having a buzzer key for producing said buzz signal, said method comprising the steps of:

actuating said buzzer key of a first subset attendant;
enabling said central processing unit of said central system to access said predetermined buzzer pair table for computing a port address of a corresponding second subset attendant to be called up by said first subset attendant;
transmitting tone-ringer-on data from said central processing unit to said corresponding second subset attendant in response to the computed port address; and
receiving said tone-ringer-on data from said corresponding second subset attendant for controlling a tone control switch to provide a speaker of said corresponding second subset attendant a buzz signal for a selected time period.

* * * * *